Patented Jan. 25, 1938

2,106,297

UNITED STATES PATENT OFFICE 2,106,297

MANUFACTURE AND USE OF CELLULOSE DERIVATIVES

Henry Dreyfus, London, England

No Drawing. Application October 23, 1934, Serial No. 749,673. In Great Britain October 26, 1933

13 Claims. (Cl. 260—102)

This invention relates to improvements in the manufacture and use of cellulose derivatives, and has particular reference to the ripening of cellulose esters, especially cellulose acetate.

In the manfacture of cellulose acetate the acetylation is customarily carried out in the presence of sulphuric acid, or a mixture of sulphuric and phosphoric acid, or zinc chloride to produce a solution in acetic acid of the so-called chloroform-soluble cellulose acetate. Water is then mixed into the solution and the whole allowed to stand at an appropriate temperature until the cellulose acetate exhibits the desired solubility characteristics. During this ripening operation, as it is called, the acetyl value of the cellulose acetate is decreased, and the solubility characteristics of the cellulose acetate change. The ripening is, of course, effected in presence of the acidic catalyst present during the acetylation, and in consequence simultaneously with the decrease in acetyl value there occurs a degradation of the cellulose molecule, the extent of which depends upon the concentration of the acidic reagent present and the temperature of the treatment. As customarily practised, the ripening is carried to a point where the cellulose acetate has an acetyl value, calculated as acetic acid, of about 52–54.5%, and the product is the well-known acetone-soluble cellulose acetate.

The present invention is concerned with a new process of ripening whereby cellulose acetates, and other cellulose esters, including in this term ether-esters of cellulose, having new and improved properties are produced. In accordance with the present invention the ripening is conducted in stages, the first stage or stages being conducted in the presence of an acidic reagent, preferably that present during the esterification of the cellulose, and preferably while the cellulose ester is in solution in the esterification mixture, and the later stage or stages being conducted in the presence of a basic reagent, and preferably an organic basic reagent of an aliphatic character, while the cellulose ester is in "suspension", i. e., in the undissolved condition. The invention covers any subsequent ripening with a basic reagent in "suspension" of a cellulose ester, which has already been ripened in the presence of an acidic reagent, e. g., a commercial acetone-soluble cellulose acetate.

Preferably, in accordance with the invention, the cellulose is acetylated or otherwise esterified so that the resulting acetate or other ester is formed in solution, and the first step of the ripening operation is conducted in the acetylation or other esterification solution in the presence of the acidic catalyst used to promote the esterification. At the end of this step of the ripening the cellulose acetate or other cellulose ester is isolated from the solution by any suitable means, as, for example, by mixing the acetylation or other esterification solution with water or other precipitant, for example benzene, carbon tetrachloride, diethyl ether, di-isopropyl ether and the like, and then, with or without intermediate washing and/or stabilization or any other desired treatment, treated with the basic reagent to carry out the further stage or stages of the ripening characteristic of the invention.

The ripening step carried out in presence of a basic reagent is preferably conducted in the presence of water or other agent capable of yielding hydroxyl groups, for example an alcohol. Such water or alcohol or other suitable agent may be the means of preventing solution of the cellulose acetate or other ester in the basic reagent where such reagent is itself a solvent for the cellulose ester undergoing treatment. Alternatively other diluents, for example benzene, toluene, xylene or other aromatic or alicyclic hydrocarbon, or petroleum or other aliphatic hydrocarbon or an ether, may be used to prevent solution. On the other hand, where the basic reagent employed for the basic ripening step is itself a poor solvent or swelling agent for the cellulose acetate or other cellulose ester or is not a solvent or swelling agent, or is sufficiently diluted to make it so, it is desirable to have present during the said basic ripening step an agent which exerts a solvent or swelling action upon the cellulose ester in such proportion that the medium as a whole has a swelling action on the cellulose ester. Such an agent is preferably a neutral or basic organic swelling agent, (which term is hereinafter used to include a solvent), which is not chemically re-active towards either the cellulose ester or the basic reagent used for the ripening step. Examples of such swelling agents which may advantageously be used, especially in conjunction with an aqueous or alcoholic solution of the basic reagent, are dioxane and ethylene methylene ether, ethylidine ethylene ether and other homologues of such cyclic ethers, methylene and ethylene dichloride and acetone, methyl ethyl ketone, diacetone alcohol, cyclohexanone and other cyclic or acyclic ketones which exert a swelling action.

As basic reagents for the later stage or stages of the ripening treatment the aliphatic bases, for example ethylene diamine, propylene diamine, diamino propanol, methylamine, ethylamine, dimethylamine, diethylamine, mono-, di- or triethanolamine, tetramethyl- or ethyl-ammonium hydroxide, amino acid salts which are basic in reaction, and similar lower members of the amines of the aliphatic series, and especially primary and secondary amines, are to be preferred, though the invention does not exclude the use of cyclic amines and particularly cyclic amines which are soluble in the preferred aqueous or alcoholic diluents referred to above, for example aniline, cyclohexylamine, pyridine, piperidine and piperazine. As previously indicated, where the base employed does not itself exert a pronounced swelling action upon the cellulose acetate or other cellulose ester, it is desirable to treat with a basic reagent in conjunction with a swelling agent, the dilution being such that solution of the cellulose ester does not occur. If desired, the amine may itself contain groups, and especially polar groups, which tend to impart increased swelling power as compared with the corresponding amine. Thus, for example, amino acid esters, for instance ethyl-amino-acetate (glycine ester) may be employed.

The basic reagents may be used in any desired concentration and at any suitable temperature provided that solution of the cellulose ester does not take place. Preferably the concentration, temperature and conditions of the reaction generally are such that the swelling action either of the amine itself or of the amine coupled with an additional swelling agent does not lead to aggregation of particles of the cellulose ester undergoing treatment. On the other hand, a substantial swelling action is desirable to promote uniformity of ripening. Thus, for example, methylamine may be employed in aqueous or aqueous alcoholic solution in concentrations of 15-25% at temperatures of the order of 25-30° C. With lower concentrations higher temperatures may be used, for example temperatures of the order of 40°, 50° or 60° C. with concentrations of 5-10%, or higher temperatures, for example up to 90° C., with still lower concentrations. With bases which are somewhat weaker such as the ethanolamines, diamino propanol and the like, higher temperatures may be used with any given concentration than with methylamine.

By means of the two or multi-stage ripening process of the present invention cellulose acetates and other cellulose esters may be produced having superior properties as compared with acetates and other esters of corresponding acetyl or other ester content produced by the commercial processes of ripening throughout in the presence of an acidic reagent. Thus, for example, whereas an acetone-soluble cellulose acetate of 52-54.5% acetyl value prepared in accordance with the commercial process may, in relation to acetone and aqueous acetone as solvent, exhibit a minimum viscosity in acetone containing say 5-9% of water, an acetate of corresponding acetyl value prepared in accordance with the present invention may exhibit a minimum viscosity in an acetone containing less water or even in anhydrous acetone, especially if the ripening in presence of the basic reagent in accordance with the present invention be applied to an acetate which has been ripened in presence of an acidic reagent and separated at a point where the acetyl figure is comparatively high, for example 57-59%. Simultaneously with this difference in the solubility characteristics of the cellulose acetate products made with the cellulose acetate have improved properties. Thus, they may exhibit a greater resistance to water and particularly a greater resistance to the delustering action of hot or boiling aqueous media. Again, where the acetate is to be used for the purpose of making moulded articles, sheets and the like the product produced in accordance with the present invention is stronger and less brittle than the products made from the prior acetates, and in addition the moisture regain may be slightly less and the tendency to warping either in sheet form or after moulding and the like may be decreased.

As previously indicated, the ripening with the basic reagent may be started at an acetyl figure of 57-59% or a corresponding ester content in the case of other esters of cellulose. However, the invention is not limited to the separation of the acetate or other ester from the acidic reagent at this stage, and comprises quite broadly the two or multi-stage process whatever be the acetyl or other ester content of the ester between the stages of ripening. For example, the invention includes the ripening in presence of an acidic reagent down to an acetyl value of 54-55%, or an acetyl value corresponding to the present commercial acetone-soluble cellulose acetate, and the further ripening of such a product in presence of a basic reagent characteristic of the invention to a lower acetyl value where such products are desired.

Esterification to produce the primary cellulose acetates or other cellulose esters in accordance with the present invention may be carried out by any suitable process. For example, the cellulose, pretreated or not with formic acid, acetic acid or other organic acid and/or sulphuric acid, hydrochloric acid, zinc chloride or other mineral acidic reagent, may be esterified with the aid of the acid anhydride so that the cellulose ester is produced in solution, and this method is preferred, or so that the cellulose ester produced does not go into solution, i. e., it is produced in suspension. The suspension method may be carried out in the presence of a non-solvent for the cellulose ester produced, for example an aromatic hydrocarbon, a petroleum hydrocarbon, an ether or the like. The esterification may be effected with the aid of any suitable catalyst, for example sulphuric acid, phosphoric acid, a mixture of sulphuric acid and phosphoric acid, zinc chloride or other chloride which is acidic in character, for example ferric chloride, stannic chloride or sulphuryl chloride. Where zinc chloride, ferric chloride, stannic chloride and like catalysts are employed in esterification, the improved resistance of the ripened cellulose acetates to water and to the delustering action of hot or boiling aqueous media may be still more pronounced than when sulphuric acid, phosphoric acid or similar strong acid catalysts are employed.

Preferably, the stage or stages of the ripening step in the presence of the acidic reagent are carried out in the acetylation or other esterification solution or suspension, but the invention does not, however, exclude carrying out this stage or stages of ripening after separation from the primary esterification solution or suspension and either in solution or suspension.

The following examples are given in order to illustrate the invention, but it is to be understood that they do not limit it in any way:—

*Example 1*

100 parts by weight of cotton linters are acetylated in an acetylating medium comprising 400 parts by weight of acetic anhydride, 600 parts by weight of acetic acid and 10 to 15 parts by weight of sulphuric acid. When acetylation is completed 20 to 30 parts by weight of water in addition to that required to destroy the excess acetic anhydride are incorporated with the acetylation solution and ripening is carried out at ordinary temperatures until a cellulose acetate having an acetyl content of 57 to 59% calculated as acetic acid is obtained. The cellulose acetate is then precipitated and suspended in a 20% aqueous solution of mono-methylamine at 20° to 30° C., and ripening is carried out until the acetyl content is reduced to about 52 to 54%. A stable acetone-soluble cellulose acetate is thus obtained.

*Example 2*

A partially ripened cellulose acetate having an acetyl content of 56 to 57% calculated as acetic acid is suspended in a 25 to 30% aqueous-alcoholic solution of ethylene diamine at 40° C. and ripening is carried out until a product having an acetyl content of 52 to 54% is obtained.

The invention comprises not only the manufacture of cellulose acetates but the manufacture of any other esters, including ether-esters, of cellulose, for example cellulose formate, cellulose propionate, cellulose butyrate, ethyl and other alkyl cellulose acetates and ether-esters of other fatty acids, and hydroxy-ethyl cellulose acetate and similar esters of hydroxy-alkyl celluloses. Preferably in the case of manufacturing ether-esters of cellulose the etherification is effected before esterification. The invention further includes filaments, yarns, fabrics, lacquers, plastics, moulded articles, moulding powders and other manufactured forms of the new cellulose acetates and other cellulose esters and ether-esters.

What I claim and desire to secure by Letters Patent is:—

1. Process for the manufacture of organic acid esters of cellulose, comprising subjecting an organic acid ester of cellulose which has been partially ripened in an acid medium to further ripening in suspension in a medium containing a base.

2. Process for the manufacture of organic acid esters of cellulose, comprising subjecting an organic acid ester of cellulose which has been partially ripened in an acid medium to further ripening in suspension in a medium containing an organic base.

3. Process for the manufacture of organic acid esters of cellulose, comprising partially ripening an organic acid ester of cellulose in an acid medium and then subjecting it to further ripening in suspension in a medium containing an organic base.

4. Process for the manufacture of organic acid esters of cellulose, which comprises partially ripening an organic acid ester of cellulose in an acid medium and then subjecting it to further ripening in suspension in an aqueous medium containing an organic base.

5. Process for the manufacture of cellulose acetate, which comprises partially ripening cellulose acetate in an acid medium and then subjecting it to further ripening in suspension in an aqueous medium containing an organic base.

6. Process for the manufacture of organic acid esters of cellulose, which comprises partially ripening an organic acid ester of cellulose in an acid medium and then subjecting it to further ripening in suspension in a medium containing a lower aliphatic amine.

7. Process for the manufacture of cellulose acetate, which comprises partially ripening cellulose acetate in an acid medium and then subjecting it to further ripening in suspension in an aqueous medium containing a lower aliphatic amine.

8. Process for the manufacture of cellulose acetate, which comprises partially ripening cellulose acetate in an acid medium and then subjecting it to further ripening in suspension in an aqueous medium containing methylamine.

9. Process for the manufacture of cellulose acetate, which comprises partially ripening cellulose acetate in an acid medium and then subjecting it to further ripening in suspension in an aqueous medium containing 10–25% of methylamine.

10. Process for the manufacture of cellulose acetate, which comprises partially ripening cellulose acetate in an acid medium and then subjecting it to further ripening in suspension in an aqueous medium containing ethylene diamine.

11. Process for the manufacture of cellulose acetate, which comprises partially ripening cellulose acetate in an acid medium and then subjecting it to further ripening in suspension in an alcoholic medium containing an organic base.

12. Process for the manufacture of organic acid esters of cellulose, which comprises partially ripening an organic acid ester of cellulose in an acid medium and then subjecting it to further ripening in suspension in a medium which has a swelling action on the organic ester of cellulose, and which contains an organic base.

13. Process for the manufacture of cellulose acetate, which comprises ripening cellulose acetate in an acid medium and then subjecting it to further ripening in suspension in an aqueous medium which has a swelling action on the cellulose acetate, and which contains methylamine.

HENRY DREYFUS.